United States Patent
Shih

(10) Patent No.: US 6,549,364 B1
(45) Date of Patent: Apr. 15, 2003

(54) OPTIMIZATION METHOD AND APPARATUS FOR A GENERALIZED FOURIER SEEK TRAJECTORY FOR A HARD DISK DRIVE SERVOMECHANISM

(75) Inventor: Teng-Yuan Shih, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 311 days.

(21) Appl. No.: 09/609,630

(22) Filed: Jul. 3, 2000

Related U.S. Application Data

(60) Provisional application No. 60/171,016, filed on Dec. 15, 1999.

(51) Int. Cl.[7] .............................................. G11B 5/596

(52) U.S. Cl. ................... 360/78.06; 360/78.07; 360/78.09

(58) Field of Search ..................... 360/78.04, 78.06, 360/78.07, 75, 78.09

(56) References Cited

U.S. PATENT DOCUMENTS

| | | | |
|---|---|---|---|
| 4,371,902 A | | 2/1983 | Baxter et al. |
| 4,539,662 A | | 9/1985 | Hatano et al. |
| 4,616,276 A | * | 10/1986 | Workman ..................... 360/77 |
| 4,802,033 A | | 1/1989 | Chi |
| 4,811,135 A | | 3/1989 | Janz |
| 4,823,212 A | | 4/1989 | Knowles et al. |
| 4,890,172 A | | 12/1989 | Watt et al. |
| 4,937,689 A | | 6/1990 | Seaver et al. |
| 4,977,472 A | | 12/1990 | Volz et al. |
| 4,982,295 A | | 1/1991 | Yakuwa et al. |
| 5,036,408 A | | 7/1991 | Leis et al. |
| 5,050,146 A | | 9/1991 | Richgels et al. |
| 5,053,899 A | | 10/1991 | Okawa et al. |
| 5,182,684 A | | 1/1993 | Thomas et al. |

(List continued on next page.)

FOREIGN PATENT DOCUMENTS

| | | |
|---|---|---|
| EP | 0 601 855 A3 | 6/1994 |
| EP | 0 663 766 A1 | 7/1995 |
| EP | 0 717 559 A2 | 6/1996 |

(List continued on next page.)

*Primary Examiner*—Andrew L. Sniezek
(74) *Attorney, Agent, or Firm*—Irell & Manella, LLP; Jeffrey P. Aiello

(57) ABSTRACT

A method and apparatus for moving a transducer across a disk surface in accordance with generalized Fourier seek trajectories for position, velocity, and acceleration control. The generalized Fourier acceleration trajectory includes one or more sine functions with the coefficients determined using a least-mean-square-error technique, which optimizes the selection of the trajectory. The corresponding velocity and position trajectories are derived based on the selected acceleration trajectory. The generalized Fourier seek method and apparatus provides improved performance and robustness of hard disk drive servomechanism, including shorter seek time. Additionally, the hard disk drive is more immune to external disturbances, and the acoustic noise caused by seeking is reduced. Using the generalized Fourier seek method, the duration of acceleration and deceleration modes may be equal or different. An acceleration seek trajectory, in general, is typically composed of an acceleration phase for acceleration mode, a zero acceleration phase for coast mode, and a negative acceleration phase for deceleration mode. The deceleration is a negative mirror image of the acceleration when the durations of acceleration and deceleration modes are the same. The acceleration (or deceleration as its mirror image) mode can be divided into a ramp-up acceleration stage, a constant acceleration stage, and a ramp-down acceleration stage. The introduction of the constant acceleration (or deceleration) stage eliminates the updates of sine states and cosine states, which are necessary when following design seek trajectories. Consequently, computational time taken by a digital signal processor is saved, further enhancing the efficiency of the generalized Fourier seek method.

33 Claims, 5 Drawing Sheets

U.S. PATENT DOCUMENTS

| | | | |
|---|---|---|---|
| 5,210,662 A | 5/1993 | Nishijima | |
| 5,235,478 A | 8/1993 | Hoshimi et al. | |
| 5,255,136 A | 10/1993 | Machado et al. | |
| 5,291,110 A | 3/1994 | Andrews, Jr. et al. | |
| 5,333,140 A | 7/1994 | Moraru et al. | |
| 5,408,367 A | 4/1995 | Emo | |
| 5,448,429 A | 9/1995 | Cribbs et al. | |
| 5,450,249 A | 9/1995 | Nagaraj | |
| 5,452,285 A | 9/1995 | Monen | |
| 5,453,887 A | 9/1995 | Negishi et al. | |
| 5,465,034 A | 11/1995 | Andrews, Jr. et al. | |
| 5,465,035 A | 11/1995 | Scarmuzzo, Jr. et al. | |
| 5,500,776 A | 3/1996 | Smith | |
| 5,523,902 A | 6/1996 | Pederson | |
| 5,570,247 A | 10/1996 | Brown et al. | |
| 5,581,420 A | 12/1996 | Chainer et al. | |
| 5,587,850 A | 12/1996 | Ton-that | |
| 5,600,506 A | 2/1997 | Baum et al. | |
| 5,606,469 A | 2/1997 | Kosugi et al. | |
| 5,608,587 A | 3/1997 | Smith | |
| 5,615,058 A | 3/1997 | Chainer et al. | |
| 5,631,783 A | 5/1997 | Park | |
| 5,640,423 A | 6/1997 | Archer | |
| 5,657,179 A | 8/1997 | McKenzie | |
| 5,659,436 A | 8/1997 | Yarmchuk et al. | |
| 5,666,238 A | 9/1997 | Igari et al. | |
| 5,680,270 A | 10/1997 | Nakamura | |
| 5,680,451 A | 10/1997 | Betts et al. | |
| 5,691,857 A | 11/1997 | Fitzpatrick et al. | |
| 5,696,647 A | 12/1997 | Phan et al. | |
| 5,710,677 A | 1/1998 | Teng et al. | |
| 5,715,105 A | 2/1998 | Katayama et al. | |
| 5,734,680 A | 3/1998 | Moore et al. | |
| 5,748,677 A | 5/1998 | Kumar | |
| 5,751,513 A | 5/1998 | Phan et al. | |
| 5,760,992 A | 6/1998 | Phan et al. | |
| 5,771,126 A | 6/1998 | Choi | |
| 5,771,130 A | 6/1998 | Baker | |
| 5,771,131 A | 6/1998 | Pirzadeh | |
| 5,796,543 A | 8/1998 | Ton-That | |
| 5,798,883 A | 8/1998 | Kim | |
| 5,867,337 A | 2/1999 | Shimomura | |
| 5,867,353 A | 2/1999 | Valent | |
| 5,892,634 A | 4/1999 | Ito et al. | |
| 5,901,009 A | 5/1999 | Sri-Jayantha et al. | |
| 5,917,670 A | 6/1999 | Scaramuzzo et al. | |
| 5,946,157 A | 8/1999 | Codilian et al. | |
| 5,946,158 A * | 8/1999 | Nazarian et al. | 360/77.04 |
| 5,949,605 A * | 9/1999 | Lee et al. | 360/77.04 |
| 6,031,684 A | 2/2000 | Gregg | |
| 6,118,616 A | 9/2000 | Jeong | |
| 6,178,060 B1 | 1/2001 | Liu | |
| 6,369,974 B1 * | 4/2002 | Asgari et al. | 360/78.14 |
| 6,441,988 B2 * | 8/2002 | Kang et al. | 360/78.06 |

FOREIGN PATENT DOCUMENTS

| | | |
|---|---|---|
| EP | 0 718 827 A2 | 6/1996 |
| GB | 2 285 165 A | 6/1995 |
| GB | 2 307 089 A | 5/1997 |
| GB | 2 308 488 A | 6/1997 |
| WO | WO 95/24035 | 9/1995 |
| WO | WO 96/23305 | 8/1996 |

* cited by examiner

GENERIZED FOURIER SEEK PROFILE (TWO-TERM DESIGN)

NORMALIZED SEEK LENGTH

GENERIZED FOURIER SEEK PROFILE (THREE-TERM DESIGN)

NORMALIZED SEEK LENGTH

OPTIMIZATION METHOD AND APPARATUS FOR A GENERALIZED FOURIER SEEK TRAJECTORY FOR A HARD DISK DRIVE SERVOMECHANISM

CROSS-REFERENCE TO RELATED APPLICATION

The present application is a Non-provisional Application of a Provisional Application entitled "AN OPTIMIZATION DESIGN OF GENERALIZED FOURIER TRAJECTORY FOR HARD DISK DRIVE SERVO MECHANISMS", assigned Provisional Application Ser. No. 60/171,016, and filed Dec. 15, 1999.

BACKGROUND OF THE INVENTION

1. Field of the Invention

The present invention relates generally to disk drives and more particularly to a method, apparatus, and computer readable program code for improving performance and robustness of hard disk drive servomechanisms.

2. Description of the Related Art

Hard disk drives include a plurality of magnetic transducers that can write and read information by magnetizing and sensing the magnetic field of a rotating disk(s), respectively. The information is typically formatted into a plurality of sectors that are located within an annular track. There are a number of tracks located across each surface of the disk. A number of vertically similar tracks are sometimes referred to as a cylinder. Each track may therefore be identified by a cylinder number.

Each transducer is typically integrated into a slider that is incorporated into a head gimbal assembly (HGA). Each HGA is attached to an actuator arm. The actuator arm has a voice coil located adjacent to a magnet assembly which together define a voice coil motor. The hard disk drive typically includes a driver circuit and a controller that provide current to excite the voice coil motor. The excited voice coil motor rotates the actuator arm and moves the transducers across the surfaces of the disk(s).

When writing or reading information, the hard disk drive may perform a seek routine to move the transducers from one cylinder (track) to another cylinder. During the seek routine the voice coil motor is excited with a current to move the transducers to the new cylinder location on the disk surfaces. The controller also performs a servo routine to insure that the transducer moves to the correct cylinder location, and is at the center of the track.

Many disk drives utilize a "bang-bang" control algorithm to move the transducer to the correct location in the shortest amount of time. The shape of the current waveform for seek routines that utilize bang-bang control theory is typically square. Unfortunately, square waveforms contain high frequency harmonics which stimulate mechanical resonance in the HGA and excite mechanical components or assemblies with high natural frequencies. This results in acoustic noise, and undesirable vibration and associated settling time due to residual vibration. The mechanical resonance created by the square waveforms of the prior art tend to increase both the settling and overall time required to write data to or read information from the disk.

It is desirable to minimize the amount of time required to write data to and read information from the disk(s). Therefore, the seek routine performed by the drive should move the transducers to the new cylinder location in the shortest amount of time. Additionally, the settling time of the HGA should be minimized so that the transducer can quickly write or read information, once located adjacent to the new cylinder.

Another seek technique is described in a co-pending application entitled "METHOD AND APPARATUS FOR REDUCING ACOUSTIC NOISE IN A HARD DISK DRIVE", Application Ser. No. 09/167,884, filed Oct. 7, 1998, now U.S. Pat. No. 6,441,988, and assigned to the assignee of the present invention. The co-pending application describes a sinusoidal seek method that reduces acoustic noise in seeking.

BRIEF SUMMARY OF THE INVENTION

The present invention comprises a method, apparatus, and/or computer program product for a hard disk drive servomechanism. In one embodiment, the apparatus comprises a disk which has a surface, a spindle motor that rotates the disk, a transducer which can write information onto the disk and read information from the disk, and an actuator arm that can move the transducer across the surface of the disk. The apparatus further includes a controller that controls the actuator arm to move the transducer across the disk surface in accordance with a generalized Fourier seek trajectory. The generalized Fourier series includes one or more sine functions having one or more coefficients that are determined using a least-mean-square error technique.

Other embodiments are described and claimed herein.

DETAILED DESCRIPTION OF THE INVENTION

The present invention comprises a hard disk drive which moves a transducer across a disk surface using a generalized Fourier seek trajectory where the one or more coefficients of the generalized Fourier series seek are determined using a least-mean-square error (LMSE) technique.

The transducer may be integrated into a slider that is incorporated into a head gimbal assembly (HGA). The HGA may be mounted to an actuator arm which can move the transducer across the disk surface. The movement of the actuator arm and the transducer may be controlled by a controller. The controller may move the transducer from a present track to a new track in accordance with a seek routine and a servo control routine.

During the seek routine the controller moves the transducer in accordance with a generalized Fourier seek trajectory. In one embodiment, the acceleration trajectory is divided into an acceleration mode, a coast mode, and a deceleration mode. In the acceleration and deceleration modes, the generalized Fourier seek acceleration trajectory is used where the one or more coefficients are determined using the LMSE technique. In the coast mode, the LMSE technique is not used.

The trajectory reduces the high harmonics found in square waveforms of the prior art, and minimizes the mechanical resonance and thus the acoustic noise of the HGA. Reducing the acoustic noise of the HGA may reduce the settling time of the transducer for reducing the duration of the seek routine. Reducing the acoustic noise may also provide accurate positioning of the transducer relative to a desired track of the disk. In one embodiment, the duration of acceleration mode and the duration of deceleration mode are equal. In another embodiment, the duration of acceleration mode and the duration of deceleration mode are unequal which may provide flexibility in further decreasing residual vibrations of mechanical components, and reducing the seek time.

Figure 1:
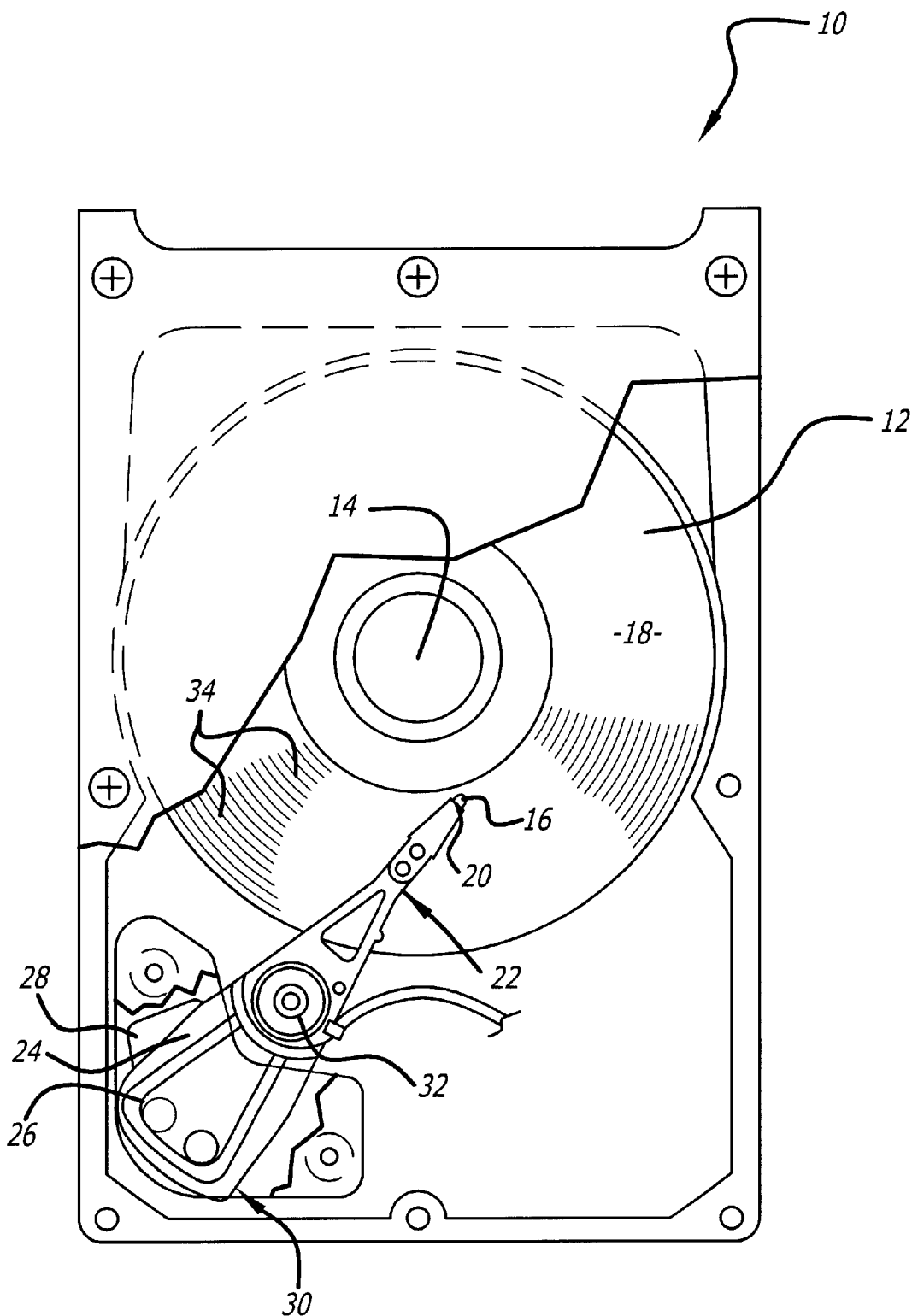
FIG. 1 is a top view of an embodiment of a hard disk drive of the present invention.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material.

The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
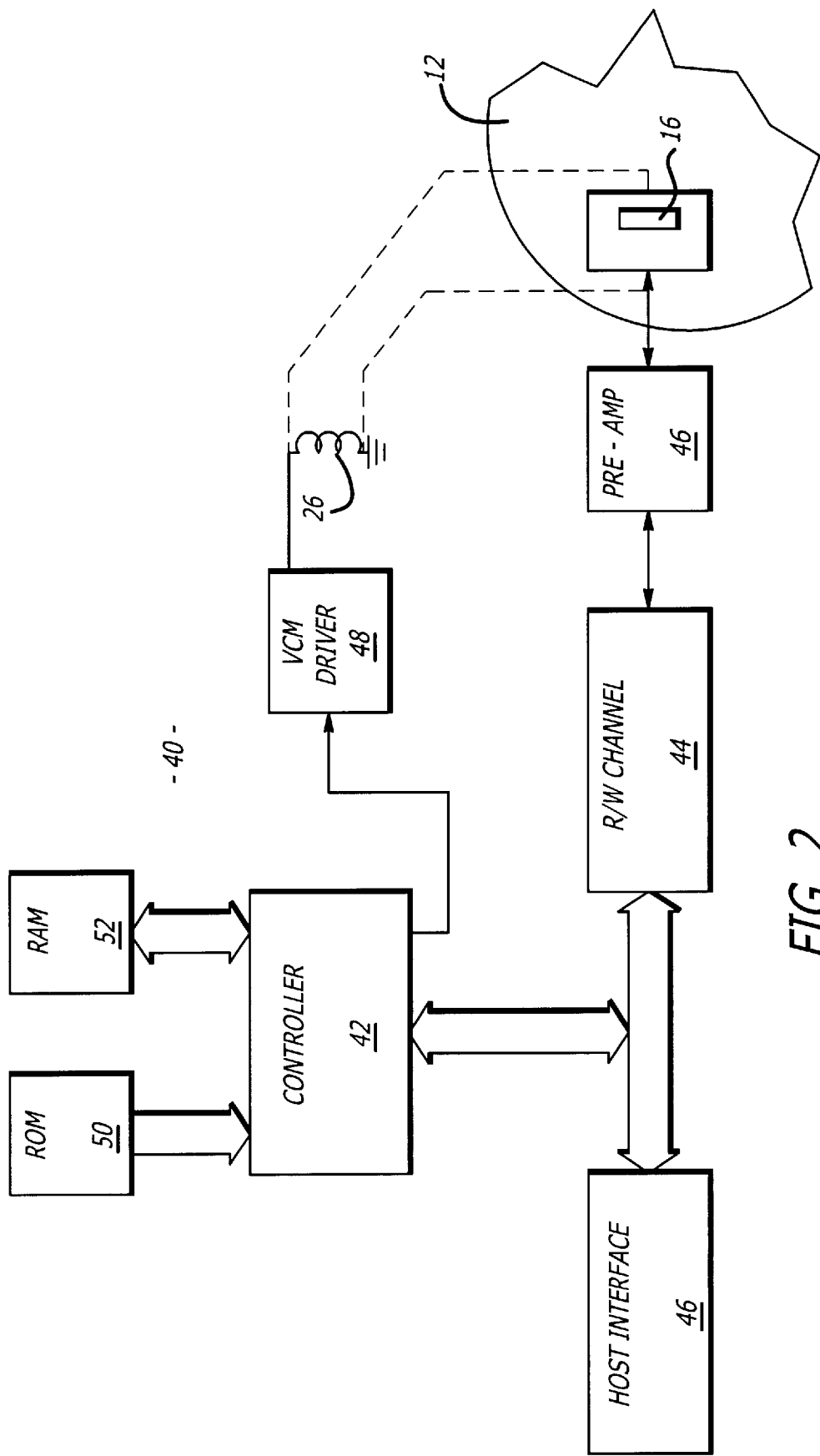
FIG. 2 is a schematic of an electrical system which controls the hard disk drive.

FIG. 2 shows an electrical system 40 which can control the hard disk drive 10.

The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track. In one embodiment, the memory device 50 contains the acceleration, velocity, and position trajectory equations of the present invention, as discussed hereinbelow, where such equations may be loaded into memory device 52 at startup.

Figure 3:
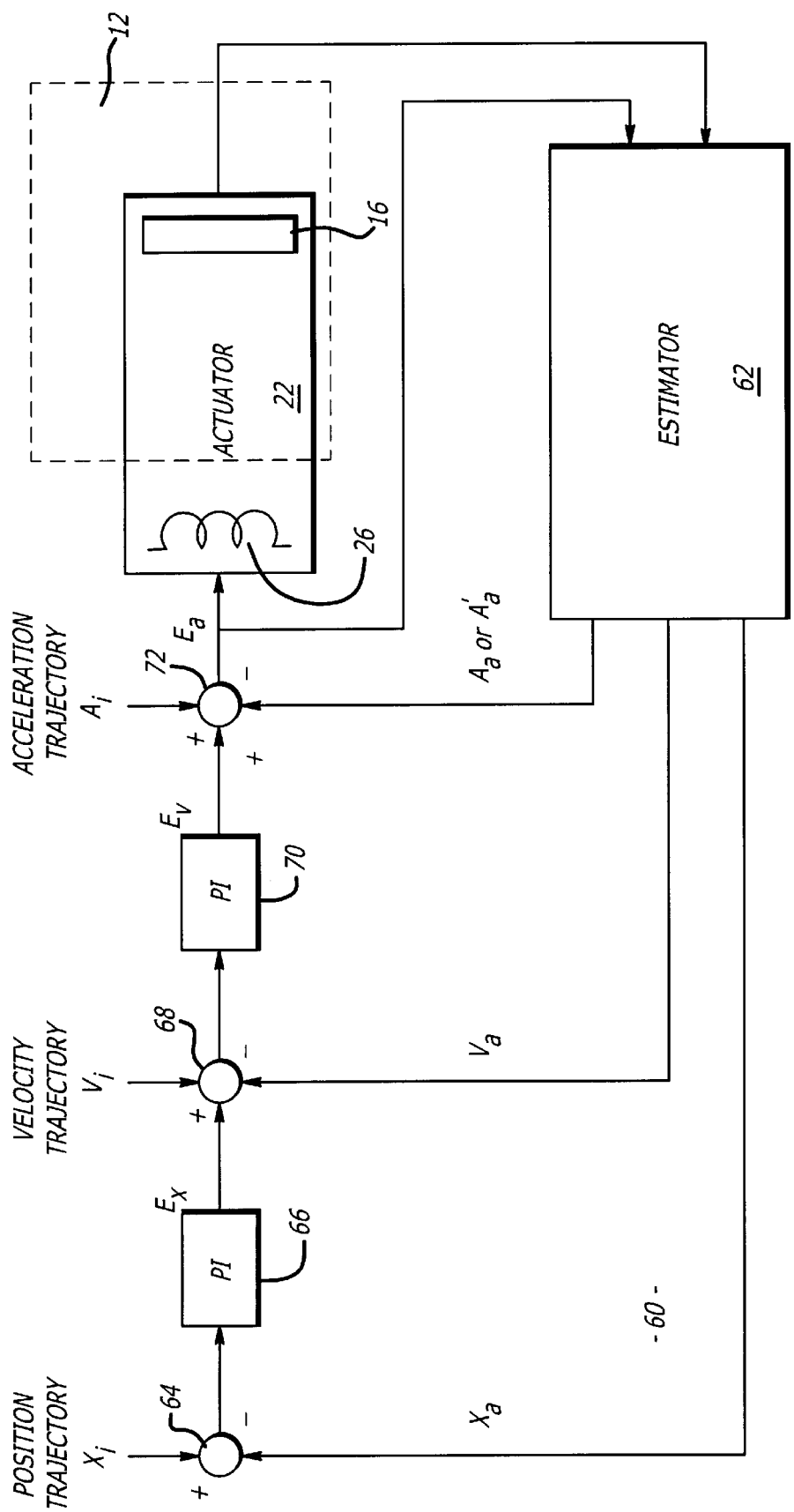
FIG. 3 is a schematic of a servo control system of the disk drive.

FIG. 3 shows a servo control system 60 that is implemented by the controller 42, which may be implemented in hardware and/or software. The servo control system 60 insures that the transducer 16 is accurately located on a desired track of the disk 12. When the controller 42 performs a seek routine the transducer 16 is moved from a first track to a new track located a distance $X_{SK}$ from the first track. The Gray codes of one or more tracks located between the new and first tracks are read as the transducer 16 moves across the disk 16. This allows the controller 42 to periodically determine whether the transducer 16 is moving at a desired speed or acceleration, or both, across the disk surface.

The control system 60 includes an estimator 62, which may be implemented in software and/or hardware. The estimator 62 can determine the actual distance or position $X_a$ that the transducer has moved from the first track. The position can be determined by reading the Gray code of a track beneath the transducer 16. The estimator 62 can also determine the actual velocity $V_a$ and actual acceleration $A_a$ of the transducer 16. The Gray codes can be periodically sampled as the transducer 16 moves to the new track location so that the controller 42 can correct the movement of the transducer 16 with the servo control 60.

The controller 42 computes a design position $X_i$, a design velocity $V_i$ and a design acceleration $A_i$ of the transducer 16 each time the transducer reads the Gray code of a track 34. The controller 42 computes the difference between the design position $X_i$ and the actual position $X_a$ at summing junction 64. In block 66 the controller 42 then computes a position correction value $E_x$ with a proportional plus integral control algorithm and the output of the summing junction 64.

The actual velocity $V_a$ is subtracted from the sum of the design velocity $V_i$ and the position correction value $E_x$ at summing junction 68. In block 70 the controller 42 computes a velocity correction value $E_v$ with a proportional plus integral control algorithm and the output of the summing junction 68.

An acceleration correction value $E_a$ is computed by subtracting the actual acceleration $A_a$ from the sum of the design acceleration $A_t$ and the velocity correction value $E_v$ at summing junction 72. The acceleration correction value $E_a$ is used to increase or decrease the current provided to the voice coil 26 and to vary the acceleration of the movement of the transducer 16.

The acceleration correction value $E_a$ may also be provided to the estimator 62 to generate a feedforward acceleration value $A'_a$. The feedforward acceleration value $A'_a$ can be provided to summing junction 72 to provide a feedforward control loop.

The design acceleration, velocity, and position waveforms provided at the respective summing junction 72, 68, and 64 are described and shown hereinbelow.

For a standard Fourier series, the number of functions in a finite sum has to be fairly large to minimize the oscillatory pattern in the resulting function. Even with the inclusion of a very large number of finite terms, the resulting curve still shows oscillation near discontinuity points. When only a few terms are used, the varying amplitude of oscillation is very large, and is not restricted to the discontinuity points. This well-known phenomenon of the Fourier series is called Gibbs phenomenon.

Figure 4:
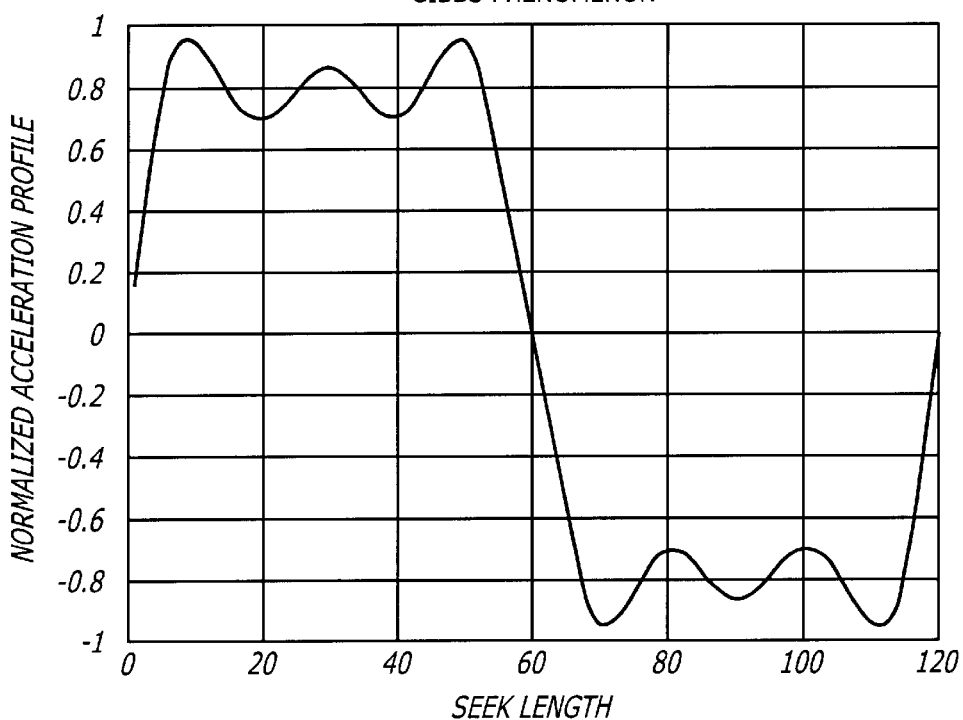
FIG. 4 is a graph showing the effect of the Gibbs phenomenon for a three-term finite sum of a Fourier sine series for a square wave.

FIG. 4 is a graph showing the effect of the Gibbs phenomenon for a three-term finite sum of a Fourier sine series for a square wave. As can be seen, the ripple at both the top and bottom portions of the graph have significant amplitudes, yielding a poor acceleration profile. Even with the addition of more terms, the amplitude of the ripple is still significant.

The seek algorithm of the present invention uses a generalized Fourier series having a finite number of sinusoidal functions, but uses one or more LMSE optimized coefficients that replace the constant coefficients associated with conventional Fourier series. In one technique, the one or more tuned coefficients are determined empirically, as described in co-pending U.S. Patent Application entitled "GENERALIZED FOURIER SEEK METHOD AND APPARATUS FOR A HARD DISK DRIVE SERVOMECHANISM", Ser. No. 09/552,112, filed Apr. 19, 2000, pending and assigned to the assignee of the present invention, the contents of which are incorporated herein by reference. Although the empirical tuned coefficients for a generalized Fourier seek method presented in the co-pending application are adequate for most practical applications, it is desirable to have a systematic technique for determining the coefficients for any specific needs.

The present invention systematically determines the tuned coefficients using a least-mean-square-error technique for robust seek profiles in hard disk drive applications.

When the unknown coefficients are selected using the LMSE technique, the Gibbs phenomenon disappears even when only a few sinusoidal terms are included. A design seek trajectory for acceleration consists of a smooth ramp-up range, a constant range, and a smooth ramp down range.

In general form, a generalized Fourier series has the following form:

$$f(t)=a_1 \sin \omega_0 t + a_3 \sin 3\omega_0 t + a_5 \sin 5\omega_0 t + a_7 \sin 7\omega_0 t + \quad (1)$$

There is a physical limit on the speed of current rise time in a voice coil motor due to the mechanical design and the controller. In addition to the hardware limit, the speed of the current rise time may be further limited to provide better settling for seek control. As herein described, the time the current reaches its design maximum $I_M$ is $T_1$, and the time the voice coil motor and the controller reduce the current output from its peak to zero is $T_2$. In the selection of the coefficients for a generalized Fourier seek trajectory, it is desirable to minimize the total mean-square error in the range of interest. Using a mathematical formulation, the error to be minimized, $\Delta$ (the mean-square error), is of the form:

$$\Delta = \frac{1}{T_2 - T_1} \int_{T_1}^{T_2} [1 - f(t)]^2 \, dt \quad (2)$$

where $T_1$ and $T_2$ are the lower and upper limits in the trajectory range of interest, and $f(t)$ is the generalized Fourier seek profile of equation (1).

The unknown coefficients are determined optimally in the sense of LMSE as follow:

$$\frac{\partial \Delta}{\partial a_1} = 0, \quad (3)$$

$$\frac{\partial \Delta}{\partial a_3} = 0,$$

$$\frac{\partial \Delta}{\partial a_5} = 0,$$

$$\frac{\partial \Delta}{\partial a_7} = 0,$$

$$\cdots$$

With the formulation, the unknown constant coefficients $\{a_1, a_3, a_5, a_7, \ldots\}$ are determined from the following linear algebraic system:

$$[C]\{a\} = \{b\}. \quad (4)$$

When, for example, a four-term generalized Fourier seek trajectory is used, the coefficient matrix $[C]$ is a 4×4 constant matrix given by $$[C] = \begin{bmatrix} c_{11} & c_{13} & c_{15} & c_{17} \\ c_{31} & c_{33} & c_{35} & c_{37} \\ c_{51} & c_{53} & c_{55} & c_{57} \\ c_{71} & c_{73} & c_{75} & c_{77} \end{bmatrix}. \quad (5)$$

The coefficient matrix is symmetric, that is, the transpose of the matrix is the same as itself. The known column matrix $\{b\}$ is a 4×1 vector given by $$\{b\} = \begin{Bmatrix} b_1 \\ b_3 \\ b_5 \\ b_7 \end{Bmatrix}. \quad (6)$$

The unknown matrix $\{a\}$ is a 4×1 vector given by $$\{a\} = \begin{Bmatrix} a_1 \\ a_3 \\ a_5 \\ a_7 \end{Bmatrix}. \quad (7)$$

The unknown coefficient vector $\{a\}$ is readily determined uniquely for the system equation (4) provided that $[C]$ is not singular, which is typically not a problem. Thus, to obtain equation (4), equation (1) is plugged into equation (2) and solved for $\Delta$. A partial derivative of the equation is then taken for each unknown coefficient, and the result is set to zero, as shown by equation (3).

The goodness and fitness in the range of interest can be compared quantitatively using a parameter ε as defined by:

$$\varepsilon = \underset{T_1 \leq t \leq T_2}{\mathrm{MAX}} |1 - f^*(t)| \qquad (8)$$

where f*(t) is the generalized Fourier seek trajectory with the coefficients determined based on the LMSE technique. It is, however, hardly necessary to apply the criterion because one can judge a design and smooth trajectory easily. The period T of the sinusoidal wave for a seek length is related to its radian natural frequency by the relationship $$T = \frac{2\pi}{\omega_0}. \qquad (9)$$

To simplify the mathematical expression, a dimensionless time scale t is defined as $$t = T\omega_0. \qquad (10)$$

Consequently, the elements in the constant coefficient matrix [C] are as follows:

$$c_{11} = (t_2 - t_1) - \cos(t_2 - t_1)\sin(t_2 - t_1), \qquad (11)$$

$$c_{13} = \cos(t_2 + t_1)\sin(t_2 - t_1) - \frac{1}{2}\cos 2(t_2 + t_1)\sin 2(t_2 - t_1),$$

$$c_{15} = \frac{1}{2}\cos 2(t_2 + t_1)\sin 2(t_2 - t_1) - \frac{1}{3}\cos 3(t_2 + t_1)\sin 3(t_2 - t_1),$$

$$c_{17} = \frac{1}{3}\cos 3(t_2 + t_1)\sin 3(t_2 - t_1) - \frac{1}{4}\cos 4(t_2 + t_1)\sin 4(t_2 - t_1),$$

$$c_{31} = c_{13},$$

$$c_{33} = (t_2 - t_1) - \frac{1}{3}\cos 3(t_2 + t_1)\sin 3(t_2 - t_1),$$

$$c_{35} = \cos(t_2 + t_1)\sin(t_2 - t_1) - \frac{1}{4}\cos 4(t_2 + t_1)\sin 4(t_2 - t_1),$$

$$c_{37} = \frac{1}{2}\cos 2(t_2 + t_1)\sin 2(t_2 - t_1) - \frac{1}{5}\cos 5(t_2 + t_1)\sin 5(t_2 - t_1),$$

$$c_{51} = c_{15},$$

$$c_{53} = c_{35},$$

$$c_{55} = (t_2 - t_1) - \frac{1}{5}\cos 5(t_2 + t_1)\sin 5(t_2 - t_1),$$

$$c_{57} = \cos(t_2 + t_1)\sin(t_2 - t_1) - \frac{1}{6}\cos 6(t_2 + t_1)\sin 6(t_2 - t_1),$$

$$c_{71} = c_{17},$$

$$c_{73} = c_{37},$$

$$c_{75} = c_{57}, \text{ and}$$

$$c_{77} = (t_2 - t_1) - \frac{1}{7}\cos 7(t_2 - t_1)\sin 7(t_2 - t_1).$$

The constant terms in equation (6), which is the right hand side of equation (4), are as follows $$b_1 = 4\sin\frac{1}{2}(t_2 + t_1)\sin\frac{1}{2}(t_2 - t_1), \qquad (12)$$

$$b_3 = \frac{4}{3}\sin\frac{3}{2}(t_2 + t_1)\sin\frac{3}{2}(t_2 - t_1),$$

-continued $$b_5 = \frac{4}{5}\sin\frac{5}{2}(t_2 + t_1)\sin\frac{5}{2}(t_2 - t_1), \text{ and}$$

$$b_7 = \frac{4}{7}\sin\frac{7}{2}(t_1 + t_2)\sin\frac{7}{2}(t_2 - t_1).$$

Extended Flexibility

The LMSE technique provides a systematic approach to determine coefficients of the generalized Fourier seek trajectories. However, the LMSE technique may not provide a sufficient condition to assure a smooth trajectory with adequately small amplitudes of ripple in the constant acceleration range for any pair of specified values $T_1$ and $T_2$. In one or more embodiments of the present invention, the generalized Fourier seek trajectory may be most powerful when a few terms, generally three or less, are included in the model. Consequently, for rare cases when the current rise time has to be very fast, there may be a more efficient mechanism for applying the generalized Fourier seek method. This mechanism involves using the LMSE technique during the ramp-up and ramp-down portions of the acceleration trajectory, and using a constant acceleration between the ramp-up and ramp-down portions of the acceleration trajectory.

In general, updating of sine and cosine states is necessary for a new sample in digital sampling when using the generalized Fourier seek method technique or its reduced form of the sinusoidal seek method. For a given seek length, the initial values of the sine and cosine states are given. The process of updating sine and cosine states continues at each sampling time until the seek ends. It takes computational time of a controller such as a digital signal processor (DSP) to update the sine and the cosine states of seek trajectories. In one or more embodiments of the present invention, updating of sine and cosine states is eliminated during portions of the seek trajectories where the acceleration and/or deceleration are a constant. During such portions of the seek trajectories, a constant design trajectory value is utilized. Consequently, in the one or more embodiment, computational time required by a DSP is saved.

This mechanism provides for a simple digital signal processor implementation. For sake of illustration and not intended as a limitation, the derivations for the following seek trajectories are made for a three-term generalized Fourier seek profile. For this illustration, $t_1$ is the ramp-up time, $t_2$ is the point at which ramp-down begins, and $t_b$ is the point at which acceleration switches to deceleration. All times are dimensionless. The trajectories are given as follow:

Acceleration Trajectory $$a(t) = K_T I_M \left[ a_1 \sin\left(\frac{\pi}{T_{SK}^A} t\right) + a_3 \sin\left(\frac{3\pi}{T_{SK}^A} t\right) + a_5 \sin\left(\frac{5\pi}{T_{SK}^A} t\right) \right], \qquad (13)$$

$$0 \leq t \leq t_1,$$

$$a(t) = K_T I_M, \quad t_1 \leq t \leq t_2,$$

$$a(t) = K_T I_M \left[ a_1 \sin\left(\frac{\pi}{T_{SK}^A}(t - t_2)\right) + \right.$$

$$\left. a_3 \sin\left(\frac{3\pi}{T_{SK}^A}(t - t_2)\right) + a_5 \sin\left(\frac{5\pi}{T_{SK}^A}(t - t_2)\right) \right], \quad t_2 \leq t \leq t_b,$$

where, $K_T$=acceleration constant;

$I_M$=maximum current provided to the voice coil; and
$T_{SK}^A$=seek time required to move the transducer from one track to another track.

Velocity Trajectory

In the velocity trajectory equation, $v(t_1)$ and $v(t_2)$ are denoted by $V_1$ and $V_2$, respectively.

$$v(t) = K_T I_M \frac{T_{SK}^A}{\pi} \left\{ a_1 \left[1 - \cos\left(\frac{\pi}{T_{SK}^A} t\right)\right] + \frac{a_3}{3}\left[1 - \cos\left(\frac{3\pi}{T_{SK}^A}t\right)\right] + \frac{a_5}{5}\left[1 - \cos\left(\frac{5\pi}{T_{SK}^A}t\right)\right] \right\}, \ 0 \le t \le t_1, \quad (14)$$

$$v(t) = V_1 + K_T I_M t, \quad t_1 \le t \le t_2,$$

$$v(t) = V_2 + K_T I_M \frac{T_{SK}^A}{\pi}$$
$$\left\{ \begin{array}{l} a_1\left[\cos\left(\frac{\pi t_2}{T_{SK}^A}\right) - \cos\left(\frac{\pi t}{T_{SK}^A}\right)\right] + \frac{a_3}{3}\left[\cos\left(\frac{3\pi t_2}{T_{SK}^A}\right) - \cos\left(\frac{3\pi t}{T_{SK}^A}\right)\right] + \\ \frac{a_5}{5}\left[\cos\left(\frac{5\pi t_2}{T_{SK}^A}\right) - \cos\left(\frac{5\pi t}{T_{SK}^A}\right)\right] \end{array} \right\},$$
$$t_2 \le t \le t_b.$$

Position Trajectory

In the position trajectory equation, $x(t_1)$ and $x(t_2)$ are denoted by $X_1$ and $X_2$, respectively.

$$x(t) = K_T I_M \frac{T_{SK}^A}{\pi} \quad (15)$$
$$\left\{ \begin{array}{l} a_1\left[t - \frac{T_{SK}^A}{\pi}\sin\left(\frac{\pi}{T_{SK}^A}t\right)\right] + \frac{a_3}{3}\left[t - \frac{T_{SK}^A}{3\pi}\sin\left(\frac{3\pi}{T_{SK}^A}t\right)\right] + \\ \frac{a_5}{5}\left[t - \frac{T_{SK}^A}{5\pi}\sin\left(\frac{5\pi}{T_{SK}^A}t\right)\right] \end{array} \right\},$$
$$0 \le t \le t_1,$$

$$x(t) = X_1 + V_1(t - t_1) + \frac{K_T I_M}{2}(t^2 - t_1^2), \quad t_1 \le t \le t_2,$$

$$x(t) = X_2 + V_2 t + K_T I_M \frac{T_{SK}^A}{\pi}$$
$$\left\{ \begin{array}{l} a_1\left[\cos\left(\frac{\pi t_2}{T_{SK}^A}\right)t - \frac{T_{SK}^A}{\pi}\left\{\sin\left(\frac{\pi t}{T_{SK}^A}\right) - \sin\left(\frac{\pi t_2}{T_{SK}^A}\right)\right\}\right] + \\ \frac{a_3}{3}\left[\cos\left(\frac{3\pi t_2}{T_{SK}^A}\right)t - \frac{T_{SK}^A}{3\pi}\left\{\sin\left(\frac{3\pi t}{T_{SK}^A}\right) - \sin\left(\frac{3\pi t_2}{T_{SK}^A}\right)\right\}\right] + \\ \frac{a_5}{5}\left[\cos\left(\frac{5\pi t_2}{T_{SK}^A}\right)t - \frac{T_{SK}^A}{5\pi}\left\{\sin\left(\frac{5\pi t}{T_{SK}^A}\right) - \sin\left(\frac{5\pi t_2}{T_{SK}^A}\right)\right\}\right] \end{array} \right\},$$
$$t_2 \le t \le t_b.$$

For simplicity, the time and distance for the actuator to travel for both the acceleration and deceleration modes are equal. For a more general case, however, the times and distances for the actuator to travel for the acceleration and deceleration modes may be different.

With the equations presented above, it can be proven that the seek time $T_{SK}$ is proportional to the square root of the seek length $X_{SK}$, as derived in the co-pending application referred to hereinabove.

$$T_{SK} = \Psi \sqrt{\frac{X_{SK}}{K_T I_M}}, \quad (16)$$

where the constant parameter $\Psi$ is determined numerically.

Since the implementation of a square root using a digital signal processor is tedious, it is practical to save a few pairs of seek time versus seek length data in memory. A seek time for any arbitrary seek length not stored in memory may be extracted by linear interpolation. For shorter seek lengths, a greater number of data points are stored in memory.

Figure 5:
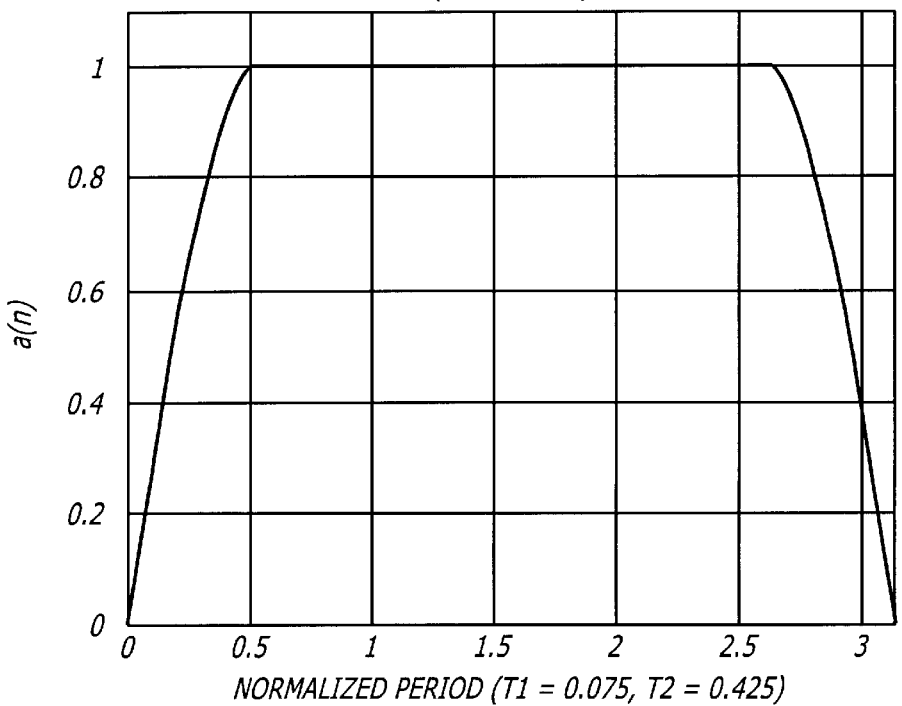
FIG. 5 shows a graph of a generalized Fourier seek acceleration trajectory using the LMSE technique for both ramp-up and ramp down portions, and a constant acceleration for the portion therebetween.

FIG. 5 shows a graph of a generalized Fourier seek acceleration trajectory using the LMSE technique for both ramp-up and ramp-down portions, and a constant acceleration for the portion therebetween. The constant acceleration portion is not based on the LMSE technique.

Design Examples

The method and apparatus of the present invention presented herein generally works well for a lower order model. That is, if the generalized Fourier seek profile consists of two or three terms, the results are typically satisfactory. Generally, a lower order model implies that the current rise time in a VCM is not especially fast. The lower order model, however, works well for most, if not all, practical applications.

Two examples are provided to demonstrate the teachings of the present invention. The design parameters and associated coefficients for generalized Fourier seek trajectories based on the LMSE technique are summarized in Table 1.

TABLE 1

|  | $T_1$ | $T_2$ | $a_1$ | $a_3$ | $a_5$ |
| --- | --- | --- | --- | --- | --- |
| Two-term Design | 0.20 | 0.30 | 1.1330 | 0.1334 | N/A |
| Three-term Design | 0.15 | 0.35 | 1.1923 | 0.2287 | 0.0369 |

Figure 6A:
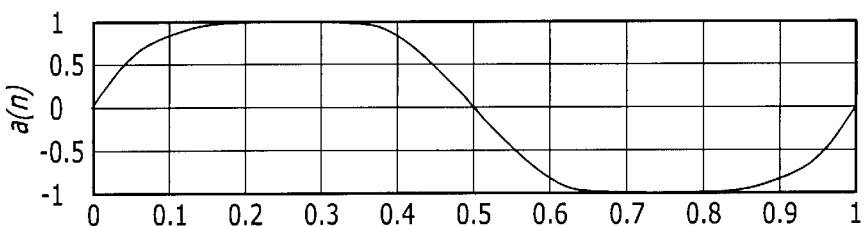
FIGS. 6A through 6C show graphs of the acceleration, velocity, and position trajectories of the two-term generalized Fourier seek method using the LMSE technique for the exemplary values in Table 1.
Figure 6B:
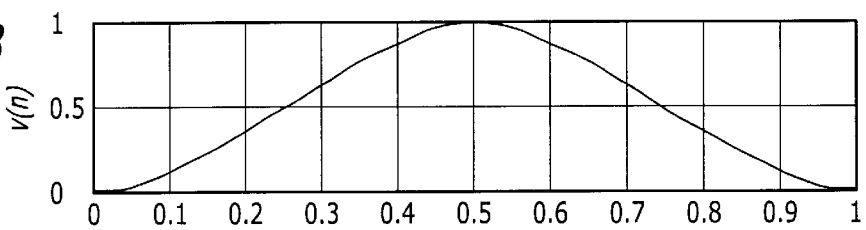
Figure 6C:
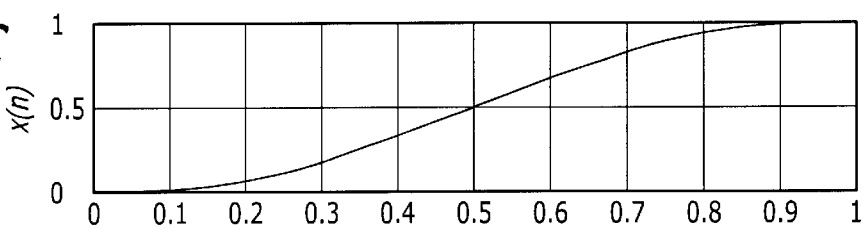

FIGS. 6A through 6C show graphs of the acceleration, velocity, and position trajectories of the two-term generalized Fourier seek method using the LMSE technique for the exemplary values in Table 1. As shown in FIG. 6A, the generalized Fourier seek acceleration trajectory is virtually flat between $T_1$, which is selected to be 20% of a half cycle, and $T_2$, which is selected to be 30% of the half cycle. In the constant acceleration range, the actuator moves at full power. In contrast, the sinusoidal seek method, as described in the co-pending application referenced in the "Description of the Related Art" section, moves at full power only at a single point during the acceleration phase. Additionally, the current rise time for the generalized Fourier seek acceleration trajectory of the present invention is much faster than its sinusoidal method counterpart. All of the trajectories are constructed in normalized and dimensionless form using equations (17) through (20) hereinbelow.

Figure 7A:
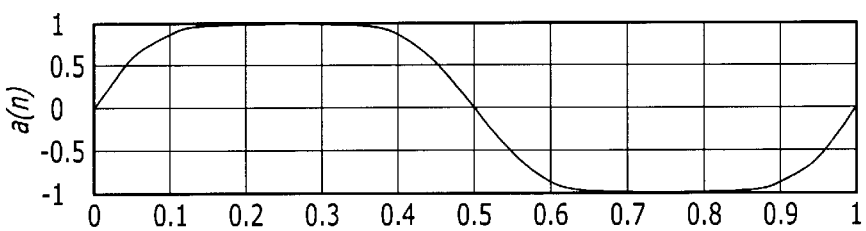
FIGS. 7A through 7C show graphs of the acceleration, velocity, and position trajectories of the three-term generalized Fourier seek method using the LMSE technique for the exemplary values in Table 1.
Figure 7B:
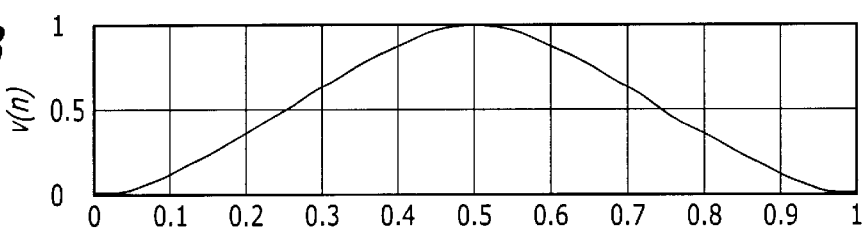
Figure 7C:
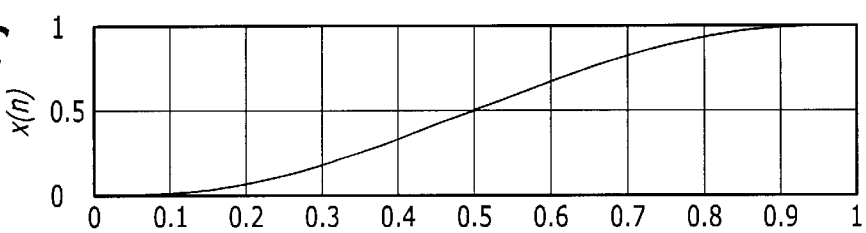

FIGS. 7A through 7C show graphs of the acceleration, velocity, and position trajectories of the three-term generalized Fourier seek method using the LMSE technique for the exemplary values in Table 1. As shown in FIG. 7A, the acceleration trajectory is essentially flat in the range between $T_1$ (15%) and $T_2$ (30%). As can be seen in both FIGS. 6A and 7A, the current rise time for the three-term design is faster than the current rise time for the two-term design. As with the two-term design, the trajectories are constructed in normalized and dimensionless form using equations (17) through (20) hereinbelow.

Seek time is denoted by $T_{SK}$, and the normalized and dimensionless time $t^*$ is denoted by $$t^* = \frac{2\pi}{T_{SK}}t. \quad (17)$$

Consequently, the normalized and dimensionless acceleration trajectory becomes $$a^*(t^*) = \frac{a(t)}{K_T I_M} = a_1 \sin t^* + a_3 \sin 3t^* + a_5 \sin 5t^* + \ldots \quad (18)$$

By integrating equation (18) once, the corresponding velocity trajectory is obtained as follows $$v^*(t^*) = \qquad (19)$$

$$\frac{v(t)}{K_T I_M} \frac{2\pi}{T_{SK}} = a_1(1 - \cos t^*) + \frac{a_3}{3}(1 - \cos 3t^*) + \frac{a_5}{5}(1 - \cos 5t^*) + \ldots$$

By integrating equation (19) once, the corresponding velocity trajectory is obtained as follows $$x^*(t^*) = \frac{x(t)}{K_T I_M}\left(\frac{2\pi}{T_{SK}}\right)^2 = \qquad (20)$$

$$a_1(t^* - \sin t^*) + \frac{a_3}{3}\left(t^* - \frac{1}{3}\sin 3t^*\right) + \frac{a_5}{5}\left(t^* - \frac{1}{5}\cos 5t^*\right) + \ldots$$

Limit Case

Given a pair of $T_1$ and $T_2$ parameters, the LMSE technique is utilized to determine coefficients for a generalized Fourier seek trajectory. In the limit case where $T_1 \rightarrow 0$, and $T_2 \rightarrow 0.5$, the generalized Fourier seek trajectory tends to be the same as a Fourier sine series representation of a square wave. Table 2 shows a comparison using a three-term model.

TABLE 2

| $T_1$ | $T_2$ | $a_1$ | $a_3$ | $a_5$ |
|---|---|---|---|---|
| 0.001 | 0.499 | 1.2732 | 0.4243 | 0.2596 |
| 0.0001 | 0.4999 | 1.2732 | 0.4244 | 0.2552 |
| 0.0000 | 0.5000 | 1.2732 | 0.4244 | 0.2546 |
| Fourier Sine Series | | 1.2732 | 0.4244 | 0.2546 |

The results shown in Table 2 indicate that the class of seek trajectories generated by the LMSE technique is more versatile, general, and flexible than the Fourier sine series for a square wave. The Fourier sine series representing a square wave is a special case of the generalized Fourier seek trajectory in the limit case.

Thus, what has been described is a seek routine wherein the transducer is moved in an essentially sinusoidal acceleration trajectory in accordance with a generalized Fourier seek trajectories, where the one or more coefficients of the generalized Fourier seek trajectories are determined by the LMSE technique, and a servo control loop that corrects the input current so that the transducer moves in a desired path.

The present invention may be implemented as a method, apparatus, system, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk which has a surface;
a spindle motor that rotates said disk;
a transducer which can write information onto said disk and read information from said disk;
an actuator arm that can move said transducer across said surface of said disk; and,
a controller that controls said actuator arm to move said transducer across said disk surface in accordance with a generalized Fourier seek trajectory, where the generalized Fourier series includes one or more sine functions having one or more coefficients that are determined using a least-mean-square error technique.

2. The hard disk drive of claim 1, wherein said generalized Fourier series includes two functions having first and second coefficients that are determined using the least-mean-square error technique.

3. The hard disk drive of claim 2, wherein said digital signal processor controls said actuator arm in accordance with a linear interpolation algorithm.

4. The hard disk drive of claim 1, wherein said generalized Fourier series includes three functions having first, second, and third coefficients that are determined using the least-mean-square error technique.

5. The hard disk drive of claim 1, wherein the generalized Fourier seek trajectory includes a ramp-up acceleration period, a constant acceleration period, and a ramp-down acceleration period, wherein the one or more coefficients are determined using the least-mean-square error technique for the ramp-up and ramp-down acceleration periods.

6. The hard disk drive of claim 1, wherein said controller is a digital signal processor.

7. The hard disk drive of claim 1, wherein said controller performs a servo routine including determining an actual position of said transducer, computing a design position of said transducer, and generating a position correction value that is a function of said actual and design positions, said position correction value being used to vary the movement of said transducer.

8. The hard disk drive of claim 7, wherein said servo routine includes determining an actual velocity of said transducer, computing a design velocity of said transducer, and generating a velocity correction value that is a function of said position correction value, said design velocity, and said actual velocity, said velocity correction value being used to vary the movement of said transducer.

9. The hard disk drive of claim 8, wherein said servo routine includes determining an actual acceleration of said transducer, computing a design acceleration of said transducer, and generating an acceleration correction value that is a function of said velocity correction value, said design acceleration, and said actual acceleration, said acceleration correction value being used to vary the movement of said transducer.

10. The hard disk drive of claim 9, wherein said acceleration correction value is also a function of a feedforward acceleration value provided in a feedforward control loop.

11. The hard disk drive of claim 9, wherein said design position, said design velocity, and said design acceleration are computed from a recursive generalized Fourier series generation algorithm.

12. The hard disk drive of claim 8, wherein said velocity correction value is a function of a proportional plus integral control algorithm.

13. The hard disk drive of claim 7, wherein said position correction value is a function of a proportional plus integral control algorithm.

14. The hard disk drive of claim 1, wherein the trajectory includes a period wherein said transducer has an essentially zero acceleration.

15. The hard disk drive of claim 1, wherein the ramp-up acceleration period is unequal in time to the ramp-down acceleration period.

16. A method for moving a transducer across a surface of a disk, comprising:
moving a transducer across the disk surface in accordance with a generalized Fourier seek trajectory, where one or more coefficients of the generalized Fourier series are determined using a least-mean-square error technique.

17. The method of claim 16, wherein moving said transducer comprises moving said transducer across the disk surface in accordance with the generalized Fourier seek trajectory including an acceleration mode, a coast mode, and a deceleration mode, where one or more coefficients of the generalized Fourier series are determined using the least-mean-square error technique.

18. The method of claim 17, wherein the acceleration mode includes a ramp-up acceleration portion, a constant acceleration portion, and a ramp-down acceleration portion, wherein the least-mean-square error technique is utilized to determine the one or more coefficients of the generalized Fourier series for the ramp-up and ramp-down acceleration portions.

19. The method of claim 17, wherein the duration of the acceleration mode is unequal to the duration of the deceleration mode.

20. The method of claim 16, wherein moving said transducer comprises moving said transducer across the disk surface in accordance with a two-term generalized Fourier seek trajectory having two coefficients that are determined using the least-mean-square error technique.

21. The method of claim 16, wherein moving said transducer comprises moving said transducer across the disk surface in accordance with a three-term generalized Fourier seek trajectory having three coefficients that are determined using the least-mean-square error technique.

22. The method of claim 16, further comprising computing a design position of the transducer, determining an actual position of the transducer, computing a position correction value from the design and actual positions, and varying the movement of the transducer with the position correction value.

23. The method of claim 22, further comprising computing a design velocity of the transducer, determining an actual velocity of the transducer, computing a velocity correction value from the design velocity, the actual velocity, and the position correction value, and varying the movement of the transducer with the velocity correction value.

24. The method of claim 23, further comprising computing a design acceleration of the transducer, determining an actual acceleration of the transducer, computing an acceleration correction value from the design acceleration, the actual acceleration, and the velocity correction value, and varying the movement of the transducer with the acceleration correction value.

25. The method of claim 24, wherein the design acceleration, the design velocity, and the design position are computed with a linear interpolation algorithm for any seek length.

26. A method for moving a transducer across a surface of a disk, comprising:
moving the transducer across the disk surface;
computing a design position of the transducer;
determining an actual position of the transducer;
generating a position correction value that is a function of the design position and the actual position;
computing a design velocity of the transducer;
determining an actual velocity of the transducer;
generating a velocity correction value that is a function of the design velocity, the actual velocity and the position correction value;
computing a design acceleration of the transducer using a generalized Fourier seek trajectory having one or more coefficients that are determined using a least-mean-square error technique;
determining an actual acceleration of the transducer;
generating a feedforward acceleration value that is a function of the actual acceleration value;
generating an acceleration correction value that is a function of the velocity correction value, the feedforward acceleration value and the design acceleration; and,
varying the movement of the transducer in response to the generation of the acceleration correction value.

27. The method of claim 26, wherein computing the design acceleration of the transducer comprises computing the design acceleration of the transducer using the generalized Fourier series seek acceleration trajectory including an acceleration mode, a coast mode, and a deceleration mode, where one or more coefficients of the generalized Fourier series are determined using the least-mean-square error technique during the acceleration and deceleration modes.

28. The method of claim 26, wherein computing the design acceleration comprises computing the design acceleration of the transducer using a two-term generalized Fourier seek trajectory that includes two coefficients that are determined using the least-mean-square error technique.

29. The method of claim 26, wherein computing the design acceleration comprises computing the design acceleration of the transducer using a three-term generalized Fourier seek trajectory that includes three coefficients that are determined using the least-mean-square error technique.

30. The method of claim 26, wherein the position correction value and the velocity correction value are computed with a proportional plus integral control algorithm.

31. The method of claim 26, wherein the design acceleration, the design velocity and the design position are computed with a recursive generalized Fourier series generation algorithm.

32. The method of claim 26, wherein the design acceleration, the design velocity and the design position are computed with a linear interpolation algorithm.

33. The method of claim 26, wherein the design acceleration includes a ramp-up portion, a coast portion, and a ramp-down portion, and wherein computing the design acceleration comprises computing the design acceleration of the transducer during the ramp-up and ramp-down portions using the generalized Fourier seek trajectory having one or more coefficients that are determined using a least-mean-square error technique.

* * * * *